United States Patent Office 2,742,459
Patented Apr. 17, 1956

2,742,459
MONO-AZO-DYESTUFFS INSOLUBLE IN WATER

Ernst Fischer, Offenbach (Main), Germany, assignor to Farbwerke Hoechst Aktiengesellschaft vormals Meister Lucius und Bruning, Frankfurt (Main)-Hochst, Germany, a company of Germany No Drawing. Application August 5, 1952,
Serial No. 302,817

Claims priority, application Germany August 10, 1951

7 Claims. (Cl. 260—204)

The present invention relates to new mono-azo-dyestuffs insoluble in water and to fiber dyed therewith; more particularly it relates to dyestuffs corresponding to the following general formula:

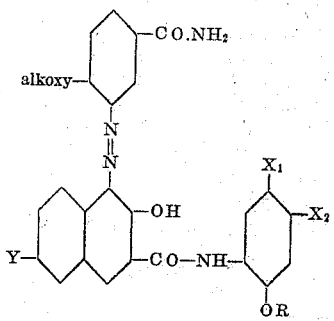

wherein one of the two substituents $X_1$ and $X_2$ represents a halogen atom and the other represents an —OR radical, R stands for a methyl or ethyl group, Y represents hydrogen, an alkoxy group or a halogen atom.

I have found that water-insoluble mono-azo-dyestuffs can be obtained by coupling in substance, on the fiber or on a substratum, adapted for the production of lakes, the diazo compounds of 1-amino-2-alkoxy-benzene-5-carboxylic acid amides with arylamides of 2,3-hydroxy-naphthoic acid of the general formula:

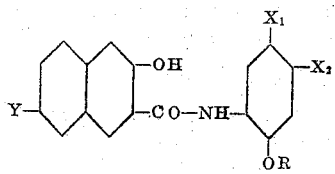

wherein one of the two substituents $X_1$ and $X_2$ represents a halogen atom and the other represents an —OR radical, R stands for a methyl or ethyl group, Y represents hydrogen, an alkoxy group or a halogen atom, and by choosing azo components free from groups imparting solubility in water, such as sulfonic acid or carboxylic acid groups.

The dyestuffs can be produced on the vegetable fiber including regenerated cellulose by dyeing or printing processes according to the known methods for the production of ice colors or they can be produced in substance. The pigment dyestuffs obtained in the latter case can be applied on textiles by padding or printing in the presence of binding agents, and, when incorporated into the spinning solutions, they can also be used for the production of spun-dyed acetate rayon and viscose rayon. Moreover, they are suitable for the preparation of very fast color lakes and, for the preparation of colored films, they can be incorporated into masses of cellulose esters or cellulose ethers, and finally, they are adapted for the dyeing of natural and artificial resins, such as the condensation products of formaldehyde and urea, phenols or amines.

Mono-azo-dyestuffs prepared from diazo compounds of 1-amino-2-alkoxybenzene-5-carboxylic acid amides and 2,3-hydroxy-naphthoic acid arylamides of similar composition as applied in the present process have already been used, according to the German patent specification 613,234, for the dyeing of organic plastic masses of high molecular weight, especially of rubber and rubber-like substances. But nothing could be learned from this in respect of the usefulness of such combinations in other fields of application, such as textile dyeing or printing. Owing to the comparatively easy saponifiability of the carboxylic acid amide group being present in the diazo components it was, on the contrary, to be expected that the dyestuffs were not capable of resisting a hot aqueous alkaline treatment which is of great importance for the dyeing and printing of textiles. Most of the known azo-dyestuffs on the fiber are, indeed, not sufficiently fast to boiling, whereas the dyestuffs prepared according to the present invention show surprisingly good properties of fastness.

Bluish red to claret tints of great brilliancy are obtained which are of high industrial value because, also when applied to the fiber as pink tints, they possess a very good fastness to light and at the same time an excellent fastness to washing.

The following examples serve to illustrate the invention, but they are not intended to limit it thereto:

EXAMPLE 1

100 grams of cotton yarn are treated for ½ hour at 35° C., in 2 liters of the impregnating bath, centrifuged and dyed in the wet state at 20° C. in the developing bath. Thereupon the yarn is rinsed, soaped first at 60° C., then at the boil, and dried.

Impregnation bath 9 grams of 1-(2',3'-hydroxy-naphthoyl-amino)-2,4-dimethoxy-5-chlorobenzene are dissolved with 27 cc. of denatured alcohol, 3 cc. of caustic soda solution of 38° Bé., 3 cc. of formaldehyde solution of 33 per cent strength and 9 cc. of warm water. The whole is made up to 2 liters with water of 35° C., 10 grams of Turkey red oil of 50 per cent strength, and 20 cc. of caustic soda solution of 38° Bé.

Developing bath 3.3 grams of 1-amino-2-methoxybenzene-5-carboxylic acid amide are diazotized, while cooling, in 30 cc. of water with 9.6 cc. of hydrochloric acid of 15° Bé. and 1.6 grams of sodium nitrite dissolved in water. By adding cold water and 20 grams of sodium acetate the whole is made up to 2 liters.

A vivid bluish red coloration of good fastness to boiling and light is obtained. The dystuff corresponds to the following formlua:

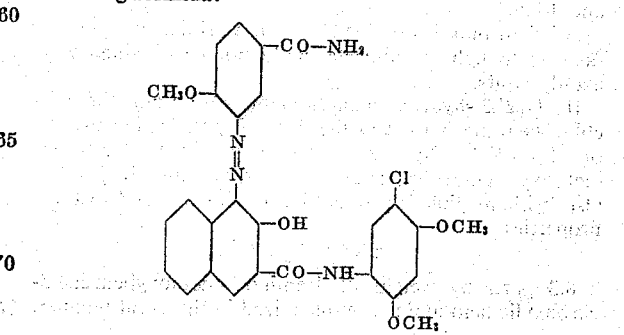

EXAMPLE 2

1 kg. of bleached cotton yarn is treated for ½ hour at 35° C. in 20 liters of the impregnating bath, centrifuged, and dyed in the wet state at 20° C. in the developing bath. Thereupon the yarn is rinsed, soaped at the boil, and dried.

Impregnation bath 6 grams of 1-(2',3'-hydroxy-naphthoyl-amino)-2,5-dimethoxy-4-chlorobenzene are dissolved with
12 cc. of denatured alcohol, 3 cc. of caustic soda solution of 38° Bé.,
9 cc. of formaldehyde solution of 33 per cent strength, and
6 cc. of hot water. The whole is made up to 20 liters with condensed water,
100 grams of Turkey red oil of 50 per cent strength, and
50 cc. of caustic soda solution of 38° Bé.,

Developing bath 8.3 grams of 1-amino-2-methoxybenzene-5-carboxylic acid amide are diazotised, while cooling, in
80 cc. of water with
24 cc. of hydrochloric acid of 15° Bé. and
4 grams of sodium nitrite dissolved in water. The whole is made up to 20 liters with cold water and
45 grams of sodium acetate.

A vivid pink coloration of good fastness to boiling and light is obtained. The dyestuff corresponds to the following formula:

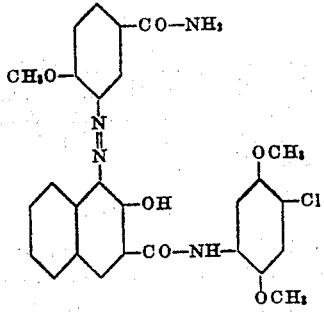

EXAMPLE 3

16 parts by weight of a dyestuff preparation of equimolar quantities of 1-(2',3'-hydroxy-naphtholyl-amino)-2,5-dimethoxy-4-chlorobenzene and of the diazoamino compound of 1-amino-2-methoxybenzene-5-carboxylic acid amide with methyltaurine are dissolved with
50 parts by weight of denatured alcohol, 10 parts by weight of caustic soda solution of 38° Bé. and 150 parts by weight of water of 50° C. The solution is poured, while stirring, into
500 parts by weight of starch-tragacanth thickening, to which there are added
10 parts by weight of caustic soda solution of 38° Bé. and
264 parts by weight of water.

This printing color is printed on a cotton or viscose fabric, which is then dried, steamed for 5 minutes at 102° C. in damp steam mixed with acetic acid and formic acid vapor, rinsed, soaped at the boil, rinsed once more and dried.

A bright pink is obtained of such a brilliancy and good fastness to light as hitherto could not be obtained with azo-dyestuffs.

If 1-(2',3'-hydroxy-naphthoylamino)-2,4-dimethoxy-5-chlorobenzene is used in the dyestuff preparation instead of 1-(2',3'-hydroxy-naphthoylamino)-2,5-dimethoxy-4-chlorobenzene, a somewhat more bluish but also brilliant pink is produced with similar good fastness properties.

EXAMPLE 4

8.3 parts by weight of 1-amino-2-methoxybenzene-5-carboxylic acid amide are diazotized in the usual manner. In order to remove the excess mineral acid, sodium acetate is added to the diazo solution, which is then stirred into an aqueous suspension of 17.9 parts by weight of 1-(2',3'-hydroxy-naphthoyl-amino)-2,5-dimethoxy-4-chlorobenzene obtained by dissolving this compound in dilute caustic soda solution and precipitating with acetic acid. The dyestuff which is rapidly formed on heating to 40° C. is filtered off after completion of the coupling, washed well, and dried. It constitutes a red powder which can be used for the production of a pigment print on textiles by one of the usual methods, for instance, by using an emulsion of polyvinyl acetate and the water-soluble, hardenable condensate of urea and formaldehyde. The print so obtained shows a vivid red tint and possesses good fastness properties, especially a very good fastness to light.

EXAMPLE 5

8.3 parts by weight of 1-amino-2-methoxybenzene-5-carboxylic acid amide are diazotized in the usual manner. The diazo solution rendered neutral to Congo-paper with sodium acetate is stirred into a suspension of 17.9 parts by weight of 1-(2',3'-hydroxy-naphthoyl-amino)-2,4-dimethoxy-5-chlorobenzene prepared by dissolving it in alcohol and dilute caustic soda solution and precipitating it with acetic acid. On heating to 40° C. a red dyestuff is rapidly formed, which, after completion of the coupling, is filtered off, washed well, and dried. The lacquers prepared by means of this dyestuff yield vivid red tints of good fastness to oil and light having also an excellent fastness to overspraying.

The dyestuff corresponds to the following formula:

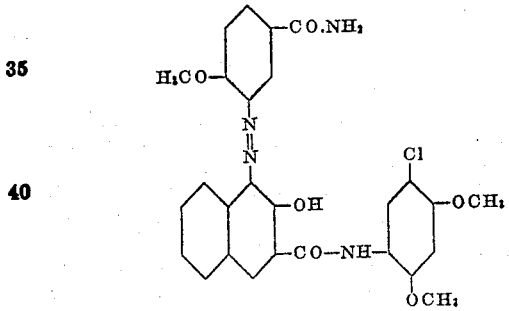

The coupling can also be carried out in the presence of a vehicle suitable for the prepartion of color lakes.

EXAMPLE 6

If in Example 5 20.1 parts by weight of 1-(2',3'-hydroxy-naphthoylamino)-2,4-dimethoxy-5-bromobenzene are used instead of 17.9 parts by weight of 1-(2',3'-hydroxy-naphthoyl-amino)-2,4-dimethoxy-5-chlorobenzene, a dyestuff of similar tint is obtained. 0.5 part by weight of this dyestuff is added to 100 parts by weight of the condensation product of urea and formaldehyde containing 30 per cent of wood dust as a filler and the mixture thus formed is ground for 12 hours in the ball mill. The mass is then placed into a press wherein, during 5 minutes, it is hardened at 140° C. under pressure to the desired moulded body. The dyestuff corresponds to the following formula:

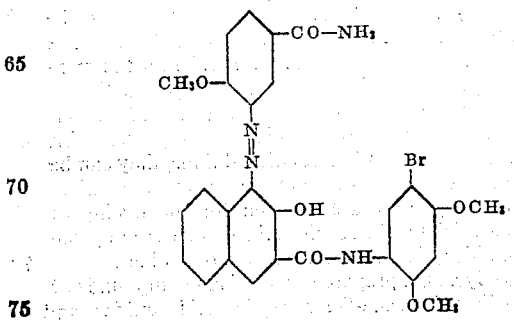

The following table indicates a number of further components which may be used according to the present invention and the tints of the mono-azo-dyestuffs thus obtained which likewise possess good fastness properties.

| Diazo Component | Coupling Component | Tint |
|---|---|---|
| (1) 1-amino-2-methoxybenzene-5-carboxylic acid amide. | 1-(2',3'-hydroxynaphthoylamino)-2.5-dimethoxy-4-bromobenzene. | red. |
| (2) 1-amino-2-methoxybenzene-5-carboxylic acid amide. | 2.5-diethoxy-4-chlorobenzene. | Do. |
| (3) 1-amino-2-ethoxybenzene-5-carboxylic acid amide. | 2.4-dimethoxy-5-chlorobenzene. | Do. |
| (4) 1-amino-2-ethoxybenzene-5-carboxylic acid amide. | 2.5-dimethoxy-4-chlorobenzene. | Do. |
| (5) 1-amino-2-ethoxybenzene-5-carboxylic acid amide. | 2.4-dimethoxy-5-bromobenzene. | Do. |
| (6) 1-amino-2-ethoxybenzene-5-carboxylic acid amide. | 1-(6'-bromo-2'.3'-hydroxynaphtholyamino)-2.5-dimethoxy-4-chlorobenzene. | bluish-red. |
| (7) 1-amino-2-ethoxybenzene-5-carboxylic acid amide. | 1-(6'-bromo-2'.3'-hydroxynaphthoyl-amino)-2.4-dimethoxy-5-chlorobenzene. | ruby. |
| (8) 1-amino-2-methoxybenzene-5-carboxylic acid amide. | ----do---- | claret. |
| (9) 1-amino-2-ethoxybenzene-5-carboxylic acid amide. | 1-(6'-methoxy-2'.3'-hydroxynaphthoylamino)-2.4-dimethoxy-5-chlorobenzene. | bluish-claret. |

Some of the mono-azo dyestuffs named in the foregoing table are characterized by the following formulas:

Item 3:

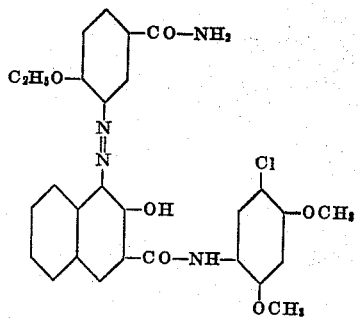

Item 4:

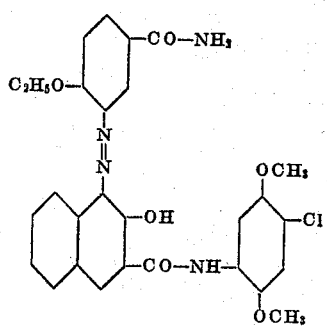

I claim:
1. The mono-azo dyestuffs insoluble in water corresponding to the following general formula

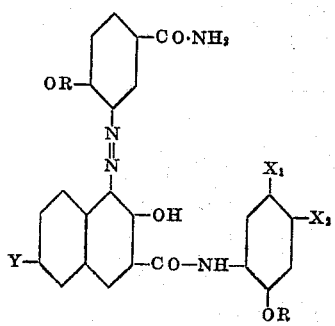

wherein one of the two substituents $X_1$ and $X_2$ represents a member of the group consisting of chlorine and bromine, and the other represents an —OR radical, R stands for one of the group consisting of methyl and ethyl, and Y stands for a member of the group consisting of hydrogen, methoxy, and bromine.

2. The mono-azo-dyestuffs insoluble in water corresponding to the following general formula

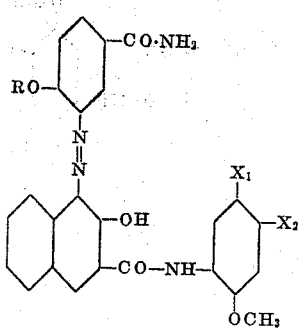

wherein one of the two substituents $X_1$ and $X_2$ represents a member of the group consisting of chlorine and bromine, and the other represents a methoxy group, and R stands for one of the group consisting of methyl and ethyl.

3. The mono-azo-dyestuff insoluble in water corresponding to the following formula

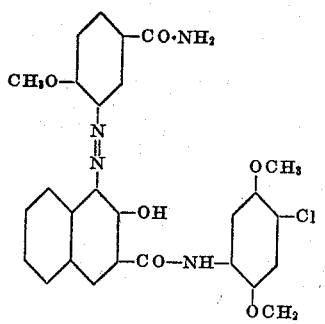

4. The mono-azo-dyestuff insoluble in water corresponding to the following formula

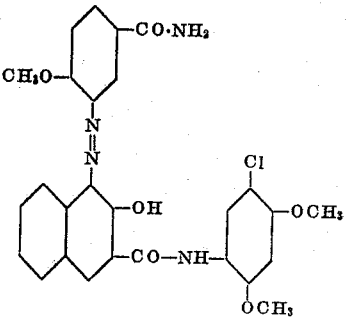

5. The mono-azo-dyestuff insoluble in water corresponding to the following formula

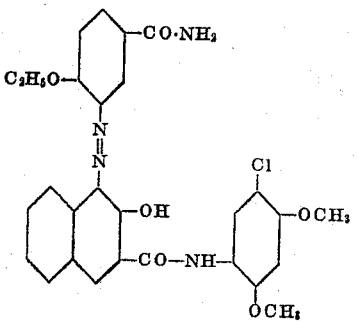

6. The mono-azo-dyestuff insoluble in water corresponding to the following formula
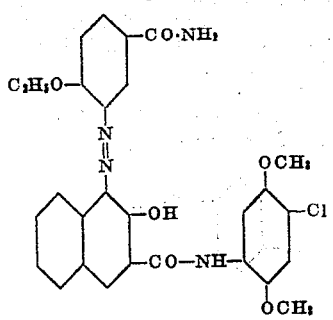
7. The mono-azo-dyestuff insoluble in water corresponding to the following formula
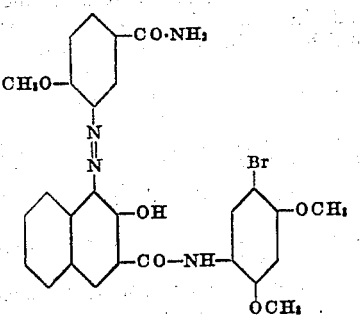
References Cited in the file of this patent
UNITED STATES PATENTS
| | | |
|---|---|---|
| 1,951,815 | Zahn et al. | Mar. 20, 1934 |
| 1,964,980 | Eichwede | July 3, 1934 |
| 2,006,211 | Fischer | June 25, 1935 |
| 2,027,897 | Bonhote | Jan. 14, 1936 |